United States Patent [19]

Storkebaum et al.

[11] Patent Number: 4,719,016
[45] Date of Patent: Jan. 12, 1988

[54] PERVAPORIZATION METHOD AND APPARATUS

[75] Inventors: Christoph Storkebaum, Brunswick; Uwe Tegtmeier, Wittmar, both of Fed. Rep. of Germany

[73] Assignee: Starcosa GmbH, Brunswick, Fed. Rep. of Germany

[21] Appl. No.: 904,341

[22] Filed: Sep. 5, 1986

[30] Foreign Application Priority Data

Sep. 6, 1985 [DE] Fed. Rep. of Germany ....... 3531834

[51] Int. Cl.$^4$ .............................................. B01D 13/00
[52] U.S. Cl. .................... 210/640; 210/416.1
[58] Field of Search ............. 210/640, 416.1, 195.2, 210/137

[56] References Cited

U.S. PATENT DOCUMENTS

| | | | |
|---|---|---|---|
| 2,159,434 | 5/1939 | Frey | 210/640 |
| 2,958,588 | 5/1961 | Binning et al. | 210/23 |
| 3,528,551 | 9/1970 | Herubel | 210/416.1 X |
| 3,540,986 | 11/1970 | Guarine | 202/187 |
| 3,750,735 | 8/1973 | Chiang et al. | 210/640 X |

FOREIGN PATENT DOCUMENTS

| | | |
|---|---|---|
| 3037736 | 9/1982 | Fed. Rep. of Germany . |
| 2151696 | 4/1973 | France . |
| 2268813 | 4/1975 | France . |
| 2430451 | 3/1980 | France ............... 210/195.2 |
| 59-216605 | 12/1984 | Japan . |
| 1209769 | 10/1970 | United Kingdom . |
| 2064346 | 6/1981 | United Kingdom . |

*Primary Examiner*—Frank Spear
*Attorney, Agent, or Firm*—W. G. Fasse; D. H. Kane, Jr.

[57] ABSTRACT

A method for separating a liquid/liquid suspension with the aid of a solution diffusion membrane provides for producing such a reduced pressure on the permeate side that the permeate evaporates and that the permeate is then again condensated back into the liquid state. In order to require a small energy input and to provide advantageous conditions for a sterile operation, it is provided that the permeate passing through the membrane is subjected to the suction effect of a jet pump and that the evaporated permeate is condensed in the drive jet of the jet pump. The permeate is supplied into a closed circuit flow in which it functions as the drive medium for the jet pump.

4 Claims, 1 Drawing Figure

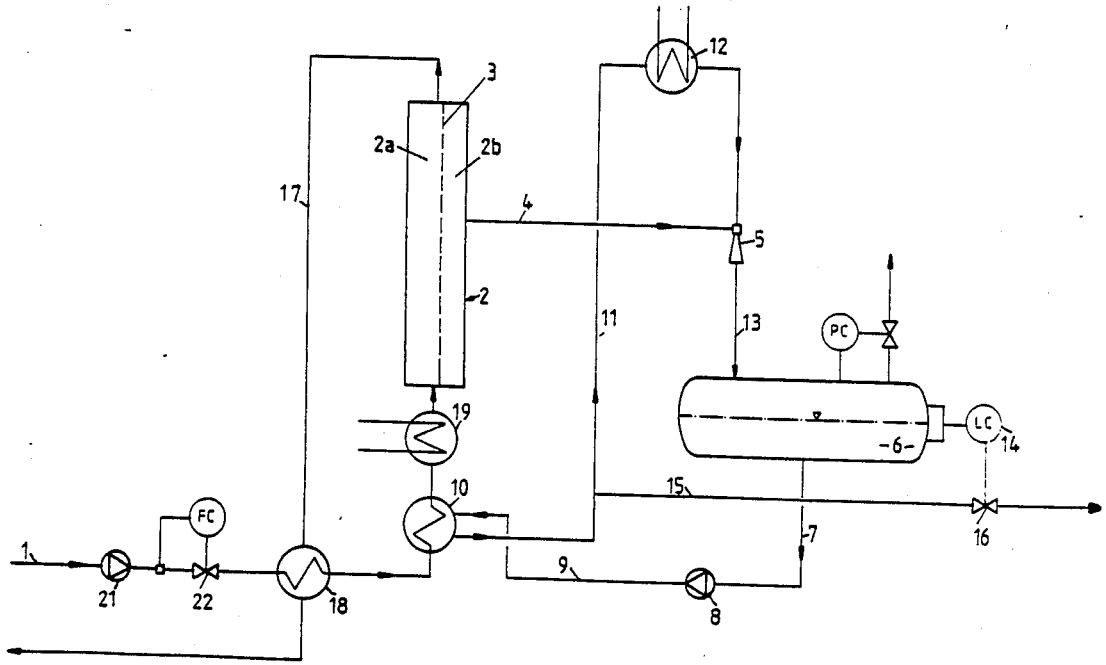

PERVAPORIZATION METHOD AND APPARATUS

FIELD OF THE INVENTION

The invention relates to a pervaporation method for separating a liquid/liquid suspension in which the suspension is supplied to a solution diffusion membrane and wherein the permeate is evaporated by producing a reduced pressure on the permeate side. Prior to transferring the permeate into a permeate collecting container the permeate is condensated into the liquid state.

The invention also relates to an apparatus for performing the mentioned method.

DESCRIPTION OF THE PRIOR ART

Methods of the above described type are known in the art in which the suspension is supplied to the inlet side or the retention side with an excess pressure and wherein on the permeate side a reduced pressure is produced with the aid of a vacuum pump for obtaining a permeate which is enriched with that component of the liquid/liquid suspension, which is able to more easily go into solution in the membrane or which is able to more easily diffuse through the membrane. The condensation of the evaporated permeate requires that the evaporation enthalpy is withdrawn from the permeate by cooling for transferring the permeate as a liquid into the permeate collecting container.

The entire pressure difference between the supply or retention side and the permeate side depends in this connection from the type and the composition of the suspension. The pressure difference also depends on the type of the permeate and on the reduced pressure required for evaporating the permeate. The pressure difference also depends on the data of the membrane. In this condition a sufficient pressure gradient is required between the inflowing suspension and the retained component exit. This pressure gradient results in a sufficiently intensive throughflow through the retention space by conversion of the pressure gradient into flow energy.

A substantial energy input is required for condensating of the permeate which becomes available as a vapor. This is so because the permeate must be cooled rather substantially in order to assure its condensation on its way into the permeate collection container at the prevailing strong reduced pressure.

OBJECT OF THE INVENTION

It is the object of the invention to further develope a method of the type described above in such a way that the energy requirement for the evaporation and condensation of the permeate is reduced and that further advantageous conditions are provided for achieving and maintaining a sterile process sequence.

SUMMARY OF THE INVENTION

The objective is achieved according to the invention in the method mentioned above, wherein the permeate coming out of the membrane is exposed to the suction effect of a jet pump and wherein the permeate is condensed in the driving jet of the jet pump and wherein the condensate is transferred into a closed circuit flow in which it is used as driving medium for the jet pump.

The reduced pressure required for the evaporation of the permeate is produced by the jet pump in a simple manner and without mechanically moved components, whereby also the pressure gradient is provided that is necessary for the separation of the suspension. The jet pump simultaneously takes care of the condensing of the evaporated permeate, in its driving jet so that the transfer of the permeate into the vapor state and its condensation into the liquid phase takes place within the course of the conveying path of the permeate without any external influence. The condensation of the evaporated permeate takes place within the closed circuit flow of the already previously liquified permeate so that a sterile process operation is possible or becomes very easy. The pressure on the suction side of the jet pump is suitably in the range of about 0.2 to 0.9 bar. The temperature adjusts itself to the saturation vapor temperature of the respective medium as a function of the mentioned pressure. The pressure required for the drive jet must be adjusted in accordance with the characteristic curve of the jet pump with the aid of of a circulating pump.

By the selection or adjustment of the reduced pressure on the permeate side it is possible to achieve a respective enrichment of the permeate by the component which goes into solution more easily through the membrane or which diffuses more easily through the membrane, whereby substantially more effective separation effect is achieved than is possible heretofore with the aid of known methods.

Energy is needed for producing the reduced pressure on the permeate side and for the condensation of the evaporated permeate. However, compared to the prior art method, a substantial energy saving is achieved and simultaneously a possibility is provided for partially recovering the expended energy.

The heat necessary for evaporating the permeate is withdrawn substantially from the retained substance while the condensation heat for converting the evaporated permeate into the liquid state is supplied to the driving jet of the jet pump. For removing this heat the permeate may be cooled while it is flowing in the closed circuit, whereby this cooling during the closed circuit flow takes place suitably by heat exchange with the suspension that is being supplied to the solution diffusion membrane. In this way, the heat which is withdrawn from the retained substance is at least partially returned to the suspension, whereby simultaneously a preheating of the suspension is achieved. Such preheating has an advantageous effect on the intended evaporation process of the permeate.

For performing the present method, an apparatus is used which, according to the invention, is characterized in that a jet pump is connected with the permeate side of the membrane filter arrangement, whereby this jet pump is connected in series with a conveying pump and with a collecting container to form a closed circuit conduit for the condensated permeate. The jet pump is simultaneously effective as a suction pump for the permeate passing through the membrane and as a device for the subsequent condensation of the evaporated permeate. The pump provided for the closed circuit flow of the permeate may in this connection simultaneously function for the removal of the portion of the permeate that may be taken out of the closed circuit flow. Preferably, the removal takes place in response to a level control in the permeate collection container. Thus, for the entire apparatus only one conveying pump is necessary.

Suitable further developements of the invention relate to the cooling of the permeate and to the preheating of the suspension by the condensation heat of the permeate.

The described method and the mentioned apparatus are, for example, especially suitable for the production of ethanol from a watery suspension, for the desalination of salt water, or even for the separation of oil water suspensions with a disperse distribution of the substances in the suspension.

BRIEF DESCRIPTION OF THE DRAWING

The single figure of the drawing an example embodiment of the apparatus for performing the present method.

DETAILED DESCRIPTION OF A PREFERRED EXAMPLE EMBODIMENT AND OF THE BEST MODE OF THE INVENTION

The drawing shows the supply conduit 1 for the suspension leading to a membrane filter device 2. A conveying pump 21 and a flow control valve 22 are arranged in the supply conduit 1. The membrane filter arrangement 2 is divided by a solution diffusion membrane 3, into a retention space 2a and into a permeate space 2b. The supply conduit 1 for the suspension leads into the retention space 2.

A permeate discharge conduit 4 leads away from the permeate space 2b. The conduit 4 is connected to a jet pump 5 which in turn is arranged in the path of a closed circuit conduit for the permeate as will be described below.

The closed circuit conduit for the permeate extends with a section 7 from the underside of a permeate collecting container 6 to a conveying pump 8. The pressure conduit 9 extending from the conveying pump 8 leads to a heat exchanger 10 arranged in the supply conduit 1 for the suspension. A further conduit section 11 of the closed circuit conduit leads from the heat exchanger 10 through a cooling device 12 also constructed as a heat exchanger, to the inlet side of the jet pump 5. A conduit section 13 leads from the jet pump 5 to the permeate collecting container 6.

A permeate discharge conduit 15 leads out of the conduit section 11 of the closed circuit conduit. A valve 16 is provided in the permeate discharge conduit 15. The valve 16 is operated through a level control device 14 in response to the liquid level in the permeate collecting container 6.

A retained substance conduit 17 serves for the removal of the retained substance out of the retention space 2a. The retention discharge conduit 17 leads through a heat exchanger 18 which, on the other hand, is arranged within the path of the suspension supply conduit 1 so that a preheating of the suspension takes place when the retained substance in the retained substance discharge conduit 17 has an increased temperature.

Within the path of the suspension supply conduit 1 there is arranged a further heat exchanger 19 in addition to the heat exchangers 18 and 10. The heat exchanger 19 is arranged directly in front of the membrane filter arrangement 2.

The described apparatus is operated in such a way that the reduced pressure produced by the jet pump 5 and which is effective in the permeate space 2b, reaches such a size that the permeate evaporates and that it reaches in the vapor state the jet pump 5 due to the suction effect. The heat needed for the evaporation is thereby withdrawn from the retained substance present in the retention space 2a. A condensation of the evaporated permeate takes place in the jet pump to form the driving jet. The driving jet contains thus the liquid permeate which is conveyed by means of the conveying pump 8 through the described closed circuit conduit and through the heat exchangers provided in this conduit.

The heat exchanger 10 supplies a portion of the heat withdrawn from the driving jet to the suspension flowing into the membrane filter arangement 2, whereby simultaneously a cooling of the permeate is achieved. The further cooling device 12 which in the example is also constructed as a heat exchanger directly upstream of the jet pump 5 causes an additional cooling of the permeate flowing in the closed circuit conduit, said additional cooling taking place directly upstream of the entrance into the jet pump 5 where the permeate forms the driving jet. Due to this additional cooling, the evaporating temperature of the permeate is maintained at a low level in the membrane filter arrangement 2. As a result, the permeate is treated gently which is of a very substantial significance where sensitive materials are involved.

In order to be able to evaporate the permeate at a reduced pressure which is as low as possible, an additional heating of the suspension is provided in the illustrated example, said additional heating being accomplished with the arrangement of the heat exchangers 18 and 19 in the supply conduit 1. The heat exchanger 18 thereby withdraws heat from the flowing off retained substance which flows through the discharge conduit 17 of the retained substance, whereby a preheating of the suspension is achieved in this manner, whereas the heat exchanger 19 is connected to an additional source of heat not shown in the drawing.

The following briefly describes an example for the ethanol production out of a watery solution or the strong concentration of ethanol in the solution with the aid of the apparatus shown in the drawing.

We start with a suspension containing 91% ethanol and 9% water. The temperature of the suspension shall be 20° C. After passing through the heat exchanger 18 and through the heat exchangers 10 and 19, the temperature is about 90° upon entry into the membrane filter arrangement 2.

The retained substance flowing out of the membrane filter arrangement 2 is cooled down to about 65° C. due to the heat withdrawal by the vaporizing of the permeate. After passing through the heat exchanger 18 the retained substance is discharged at about 25° C.

The jet pump 5 causes a reduced pressure of about 0.4 bar in the permeate space 2b of the membrane filter arrangement and in the permeate transition conduit 4. The temperature of the evaporated permeate is about 65° C.

Due to the condensation of the permeate in the jet pump, the permeate is heated so that the permeate in the permeate collecting container 6 assumes a temperature of about 80°. The permeate fills the container 6 up to the dashed line. In the closed circuit flow of the permeate a cooling takes place initially through the heat exchanger 10 to about 65° C. A further cooling takes place upon passing through the cooling device 12 also operating as a heat exchanger to about 45° C. The permeate is supplied to the jet pump 5 as a drive jet at this temperature. By using a hydrophilic solution diffusion membrane 3 and by operating the arrangement while maintaining the above data one obtains a mass flow of the retained substance of 8.7 while the permeate discharge takes place with a mass flow of 1 and the mass flow of the supplied suspension takes place at 9.7. The permeate discharge through the conduit 15 from the arrangement in this example has a composition of 80% water and 20% ethanol, whereas the discharged retained substance consists of 99.2% of ethanol and only 0.8% of water at a mass flow of 8.7.

In the described example a partial feedback of the retained substance is not provided for, although this is quite possible, and in this manner a lower preheating of the suspension or of the mixture of the suspension and the fed back retained substance is necessary, whereby the energy supplied through the heat exchanger 19 can be substantially reduced. In connection with a multiple feedback of the retained substance it is possible to work with a lower entrance temperature of the suspension or of the mixture of the suspension and the retained substance in the membrane filter arrangement 2.

Although the invention has been described with reference to specific example embodiments, it will be appreciated that it is intended to cover all modifications and equivalents within the scope of the appended claims.

We claim:

1. A pervaporation method for separating a liquid/liquid suspension, comprising the following steps: supplying said suspension to one side of a solution diffusion membrane, producing by means of a jet pump a reduced pressure on the other, permeate side of said membrane for evaporating a permeate coming through said membrane, passing evaporated permeate to said jet pump for condensating evaporated permeate in the driving jet of said jet pump, introducing condensated permeate into a closed circuit flow in which said condensated permeate is supplied as a drive means to said jet pump, cooling said condensated permeate in said closed circuit flow, and transferring condensated permeate into a collecting container.

2. The method according to claim 1, wherein said cooling of said condensated permeate is performed in said closed circuit flow by heat exchange with said suspension that is being supplied to said one side of said solution diffusion membrane.

3. Apparatus for separating a liquid/liquid suspension, comprising a membrane filter arrangement including a solution diffusion membrane having a retention side and a permeate side, means for supplying said suspension to said retention side of said solution diffusion membrane, means for discharging of retained substance from said retention side of said solution diffusion membrane, jet pump means connected by a suction pipe to said permeate side of said membrane for producing a reduced pressure which evaporates the permeate, closed circuit conduit means connected to said jet pump, a conveying pump connected to said closed circuit conduit means, said jet pump being arranged in series with said conveying pump, whereby evaporated permeate is condensated is the driving jet of said jet pump and whereby condensated permeate is introduced into said closed circuit conduit means as a driving medium for said jet pump means, a collecting container connected to said closed circuit conduit means for receiving condensated permeate, and cooling means in said closed circuit conduit means for cooling condensated permeate.

4. The apparatus according to claim 3, wherein said cooling means comprise at least one cooling device constructed as a heat exchanger through which said suspension and said condensated permeate flow.

* * * * *

UNITED STATES PATENT AND TRADEMARK OFFICE
CERTIFICATE OF CORRECTION

PATENT NO. : 4,719,016

DATED : January 12, 1988

INVENTOR(S) : Christoph Storkebaum, Uwe Tegtmeier

It is certified that error appears in the above-identified patent and that said Letters Patent is hereby corrected as shown below:

In [57] Abstract, line 6, replace "small" by --smaller--.

In Claim 1, (column 5, line 28), replace "liquid/-" by --liquid/--.

In Claim 3, (column 6, line 25), replace "condensated is" by --condensated in--.

Signed and Sealed this

Twentieth Day of September, 1988

Attest:

DONALD J. QUIGG

*Attesting Officer*    *Commissioner of Patents and Trademarks*